June 17, 1930.  W. L. MILLER  1,765,026

METHOD OF MAKING MINERAL OR ROCK WOOL BATS

Filed Dec. 28, 1928

Inventor
William Lott Miller

Patented June 17, 1930

1,765,026

UNITED STATES PATENT OFFICE

WILLIAM LOTT MILLER, OF WINONA, MINNESOTA

METHOD OF MAKING MINERAL OR ROCK WOOL BATS

Application filed December 28, 1928. Serial No. 329,063.

It is the object of this invention to facilitate the handling of mineral or rock wool by supplying it in the form of a felted blanket or bat which has sufficient mechanical bond between the particles for all practical purposes and at the same time to retain in the bat a maximum of the heat insulating qualities of such wool.

Other objects are to improve the bat formed from such wool by making it of unusually uniform thickness while improving the efficiency and speed of the manufacturing process.

In my co-pending application for patent bearing Serial No. 208,955, filed July 28th, 1927, I have described a machine and method for forming a mineral wool bat and the present invention is an improvement on that of said earlier application in that a more uniform distribution of the hot particles in the settling chamber is obtained and efficient means are provided for making a relatively tough bat by a novel method of introducing and mixing with the wool a suitable bonding material.

I am aware that attempts have been made heretofore to secure a bonding of the fibres by introducing a liquid cement into the air or steam jet before it strikes the molten mineral or rock. However, with the old method, if sufficient adhesive is introduced to effect a bonding of the particles, they become coated and cause trouble by adhering to the walls and other surfaces in the settling chamber. Accumulations on such surfaces periodically fall and produce objectionable scab in the finished wool. Further, where a liquid cement is introduced as heretofore the insulating qualities of the product are reduced.

In my improved process I introduce a cementitious material in dry, granular or powdered form and of such a nature that it is softened and rendered adhesive only when subjected to the heat or moisture or both in the settling chamber. The amount of granular cement is controllable so that the wool particles are not coated but are bound together at relatively dispersed points in the finished bat. Further in my novel method the cementitious material is introduced directly into the settling chamber and preferably into the rapidly moving stream of wool particles near the point of ingress. I insure the covering of the conveyor, upon which the particles settle, with a layer of the particles unmixed with cement and this prevents adhesion of the particles to the conveyor.

The invention will be best understood by reference to the accompanying drawings in which Figure 1 is a longitudinal section through the settling chamber and adjacent mechanism; Fig. 2 is a plan view of the means for supplying a stream of granular or powdered cementitious material to the settling chamber; Fig. 3 is a vertical section taken on the line 3—3 of Fig. 2; Fig. 4 is a horizontal section taken on the line 4—4 of Fig. 3 and Fig. 5 is a front or delivery end view of the tube for distributing the particles uniformly in the settling chamber.

A long, narrow settling chamber 6 is provided and in the bottom of this chamber is mounted a conveyor 7 adapted to be continuously operated to receive the fibrous particles and deliver them in the form of a loosely felted blanket through an opening 8 in the delivery end of the chamber 6. The construction of a suitable conveyor 7 and chamber 6 is more fully described in my above-mentioned co-pending application. Particles of mineral or rock wool may be formed in the usual manner by melting the rock or other mineral in a cupola 9 adapted to deliver a stream 10 of the molten material. Steam or air under pressure is supplied through a pipe 11 and directed against the stream 10 in a jet from a nozzle 12 of well known construction.

The jet from the nozzle 12 strikes the stream 10 of mineral and blows it into the chamber 6 through a distributing tube 13. The mineral is simultaneously broken up into fine fibre-like particles which are delivered to the chamber 6 at a high temperature.

The purpose of the tube 13 is to so direct the stream of particles that they do not collect along the center of the conveyor 7 or strike the side walls in excessive quantities. It is evident that improper distribution may produce scab or make the bat thicker at the sides than along the center of the conveyor 7, or the resulting bat may be made too thin along its edges. To secure proper distribution the tube 13, as best shown in Fig. 5, is made from a section of cylindrical pipe with its outlet end flattened to substantially elliptical shape, the degree of flattening being dependent on the width of the settling chamber 6. I have found that for a settling chamber 30 feet long and 6 feet wide the tube 13 may be made about 6 feet in length and from a steel pipe about 15 inches in diameter with its outlet end flattened so that the short diameter of the ellipse is equal to about 8 inches. To withstand the heat and wear caused by the particles of the mineral passing therethrough I prefer to construct the tube 13 from high carbon steel with smoothly finished interior.

Into the stream of particles near the discharge end of the tube 13 I deliver a stream of cementitious material 14 which is continuously supplied from a container or hopper 15. This cementitious material 14 is preferably in the form of dry, solid particles and of such a nature that it only acquires a softened, adhesive consistency when heated to the temperatures in the chamber 6. A suitable asphalt, sodium silicate, casein glue, valspar, hide stock glue or even wax-like substances having a high melting point may be employed as the cement or binding material 14. It will be evident that in order to soften some of these substances at least a small amount of added moisture is necessary, but this is usually supplied in the steam which is commonly delivered through the nozzle 12.

Mechanism is provided for delivering the cementitious material continuously at a predetermined rate of flow during the operation of forming the bat upon the conveyor 7. As illustrated, the hopper 15 communicates at its bottom with an outlet tube 16 in which is mounted a screw 17 adapted to be continuously rotated at a slow speed for delivering the granular or powdered cement or binder at the desired rate. The screw 17 is secured on a vertical shaft 18 extending up through the hopper 15 and a beveled gear 19 is fixed on the upper end of the shaft 18 to be driven by a motor 20. A worm 21 on the motor shaft drives a worm wheel 22 on a horizontal shaft 23 and the latter, which is supported in a bearing 24, carries a beveled pinion 25 in mesh with the gear 19. A supply of the binding or cementitious material may be delivered into the hopper 15 through a suitable opening having a removable closure 26. As shown in Figs. 3 and 4, the shaft 18 is enclosed in a protecting sleeve 27 and has bearings in the top of the hopper and in a spider 28.

The fine fibre-like particles upon entering the chamber 6 and as they are freed from the tube 13 are of such a light nature that they tend to swirl about and are carried by eddy currents rearward of the delivery end of the tube, as shown at 29 in Fig. 1. To prevent such eddy currents from depositing particles upon the top of the tube 13 and upon other surfaces rearward of the delivery end of said tube, I mount a baffle 30 in the rear end of the chamber 6. The baffle 30 extends from side to side of the chamber 6 and from the top to a point adjacent to the conveyor 7. By this arrangement I also confine the portion of the stream of incoming particles adjacent to the surface of the conveyor 7 and utilize the eddy currents to deposit a thin layer of wool upon the rearward end of the conveyor 7. This initial deposit of particles is substantially free from cementitious material because the latter is delivered into the upper part of the incoming stream and is quickly blown or carried away from the rearward end of the conveyor. Thus it will be evident that a protective coating of non-adhesive fibres is supplied to the conveyor and this insures against troublesome adherence of the wool to the conveyor. The stream 14 of a comminuted cementitious material is quickly dispersed and thoroughly mixed with the wool particles before the dry material is softened sufficiently to collect the particles in masses. A uniform mixture thus settles upon the non-adhesive layer on the conveyor where the heat renders the binder sufficiently gummy to afford a bond between the particles at dispersed points in a loosely felted blanket 31 which is carried out through the opening 8 of the chamber 6.

The loosely felted blanket 31 of wool particles and adhesive is thus continuously delivered through the opening 8 and must be compressed or reduced in thickness before it can be conveniently handled. Any suitable compressing means for the blanket 31 may be employed, such as the travelling belt of my above identified co-pending application, or as herein illustrated, a pressure plate 32 may be applied to the upper surface of the blanket. This plate 32 extends from side to side of the chamber 6 and out through the opening 8 above the conveyor 7. It is supported upon the side walls of the chamber 6, within said chamber, upon a pair of links 33 and oscillating movement is imparted to its outer end by an arm 34 connected to a cam operated lever 35. This lever has a pivotal support 36 upon the end of the chamber 6 and is operated by a cam 37 fixed on a power-driven shaft 38. An oblique link 39 also connects the plate 32 to the end of the chamber 6 to cause forward movement upon the downward stroke of the plate 32 and backward movement when said plate is raised by the cam 37. The pressure plate 32 is more fully described and claimed in my co-pending application Serial No. 329,062 of even date herewith.

It will now be understood that the loosely felted blanket 31 is continuously delivered by the conveyor 7 into contact with the bottom of the plate 32 and that said plate is continuously oscillated, to compress the blanket, by continuous rotation of the shaft 38. Thus a bat 40 of the wool particles is formed and delivered automatically upon any suitable surface such as the receiving conveyor 41. The bat may be cut into sections suitable for forming panels of insulation or may be rolled in measured quantities for shipping, or may be further pressed to cause the bat to become denser and stiffer. An oiled wool may be incorporated in the bat formed by my improved process to make a waterproof and fireproof bat or board.

Having described my invention what I claim as new and desire to protect by Letters Patent is:

1. The method of making a mineral wool bat which consists in producing hot fibre-like particles in a rapidly moving stream, mixing with the stream of previously formed particles a normally dry comminuted cement adapted to be softened and rendered adhesive by the application of heat, allowing said particles and mixed cement to settle upon a moving surface in the form of a loosely felted blanket and then compressing said blanket to form a bat of the desired thickness and density.

2. The method of making a mineral wool bat which consists in producing hot fibre-like particles in a rapidly moving stream, introducing into said stream of previously formed particles a dry comminuted cement adapted to be softened and rendered adhesive by the application of heat, allowing said particles to settle upon a moving surface in the form of a loosely felted blanket and continuously withdrawing said blanket and compressing it to form a continuous bat of the desired thickness and density.

3. The method of forming a mineral wool bat, which consists in producing fibre-like particles from a molten mass, blowing a stream of said particles while hot into a chamber and allowing them to settle therein while controlling the distribution of the particles to form a loose blanket of substantially uniform thickness, simultaneously introducing into the stream of particles in said chamber a stream of cementitious material while limiting the quantity of such cementitious material to prevent excessive coating of the particles and then compressing the blanket so formed to produce a bat of the desired thickness and density in which at least some of the particles are cemented together.

4. The method of forming a mineral wool bat which consists in producing fibre-like particles from a molten mass, blowing a stream of said particles while hot into a chamber and allowing them to settle upon a moving surface therein while controlling the distribution of the particles to form a loose blanket of substantially uniform thickness, introducing into the inflowing stream of particles a stream of normally dry, comminuted, cementitious material and then compressing the blanket so formed to produce a continuous bat of the desired thickness and density in which the particles are cemented together at dispersed points.

5. The method of forming a mineral wool bat which consists in producing fibre-like particles from a molten mass and blowing said particles while hot into a chamber, allowing them to settle upon a moving surface therein while controlling the distribution of the particles to form a loose blanket of substantially uniform thickness, simultaneously introducing into the inflowing stream of particles a stream of comminuted cementitious material while limiting the quantity of such cementitious material to prevent coating of the particles and then compressing the blanket so formed to produce a continuous bat of the desired thickness and density in which the particles are cemented together at dispersed points.

6. The method of forming a mineral wool bat which consists in blowing a stream of the particles into a chamber and allowing them to settle upon a moving surface to form a non-adhesive layer upon said surface, applying an admixture of hot fibre-like particles and an adhesive to the layer so formed to complete a loosely felted blanket and continuously withdrawing the blanket and compressing it to form a bat suitable for insulating purposes.

7. The method of forming a mineral wool bat which consists in blowing a stream of hot mineral particles into a chamber and allowing a part of said stream to settle upon a moving surface to form a non-adhesive layer upon said surface, introducing into another part of said stream a comminuted cementitious material adapted to be softened and rendered adhesive by heat, applying an admixture of hot fibrous particles and said cementitious material to the layer so formed and continuously forming a blanket of said particles while withdrawing the blanket and compressing it to form a bat suitable for insulating purposes.

In testimony whereof, I have hereunto signed my name to this specification.

WILLIAM LOTT MILLER.